(12) United States Patent
Evans et al.

(10) Patent No.: US 11,209,899 B2
(45) Date of Patent: Dec. 28, 2021

(54) HIGH DYNAMIC RANGE FOR HEAD-MOUNTED DISPLAY DEVICE

(71) Applicant: Advanced Micro Devices, Inc., Sunnyvale, CA (US)

(72) Inventors: Michael A. Evans, Boxborough, MA (US); Nathaniel David Naegle, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 646 days.

(21) Appl. No.: 15/807,483

(22) Filed: Nov. 8, 2017

(65) Prior Publication Data

US 2019/0138088 A1    May 9, 2019

(51) Int. Cl.

| | |
|---|---|
| *G06F 3/01* | (2006.01) |
| *G02B 27/01* | (2006.01) |
| *H04N 13/133* | (2018.01) |
| *H04N 13/344* | (2018.01) |
| *G09G 5/00* | (2006.01) |
| *H04N 13/383* | (2018.01) |

(52) U.S. Cl.
CPC ........... *G06F 3/013* (2013.01); *G02B 27/017* (2013.01); *G06F 3/017* (2013.01); *G09G 5/00* (2013.01); *H04N 13/133* (2018.05); *H04N 13/344* (2018.05); *H04N 13/383* (2018.05); *G02B 2027/014* (2013.01); *G02B 2027/0118* (2013.01); *G02B 2027/0187* (2013.01)

(58) Field of Classification Search
CPC ....... G06F 3/013; G06F 3/017; H04N 13/383; H04N 13/344; H04N 13/133; G02B 27/017; G02B 2027/0119; G02B 2027/014; G02B 2027/0187; G09G 5/00

USPC ......................................................... 351/209
See application file for complete search history.

(56) References Cited

U.S. PATENT DOCUMENTS

2006/0114414 A1 *  6/2006  McGrath .............. A61B 3/0091
                                                      351/246

OTHER PUBLICATIONS

Arabadzhiyska, E. et al., "Saccade Landing Position Prediction for Gaze-Contingent Rendering", ACM Transactions on Graphics, Jul. 2017, 12 pgs., vol. 36, Issue 4, Article No. 50, ACM, New York, NY, USA.

(Continued)

*Primary Examiner* — Thomas K Pham
*Assistant Examiner* — Mitchell T Oestreich
(74) *Attorney, Agent, or Firm* — Volpe Koenig (57) ABSTRACT

A technique for adjusting the brightness values of images to be displayed on a stereoscopic head mounted display is provided herein. This technique improves the perceived dynamic range of the head mounted display by dynamically adjusting the pixel intensities (also known generally as "exposure") of the images presented on the head mounted display based on a detected gaze direction. The head mounted display includes an eye tracker that is able to sense the gaze directions of the eyes. The eye tracker, head mounted display, or a processor of a computer system receives this information, determines an intersection point of the eye gaze and a screen within the head mounted display and identifies a gaze area around this intersection point. Using this gaze area, the processing system adjusts the pixel intensities of an image displayed on the screen based on the intensities of the pixels within the gaze area.

20 Claims, 6 Drawing Sheets

(56) References Cited

OTHER PUBLICATIONS

Tanous, Jim, "Acer Predator Z271T With Tobii Eye Tracking: The Monitor That Watches You Back", PC Perspective, Aug. 23, 2017, 13 pgs. (Retrieved at: https://www.pcper.com/reviews/Displays/Acer-Predator-Z271T-Tobii-Eye-Tracking-Monitor-Watches-You-Back on Nov. 8, 2017).

* cited by examiner

HIGH DYNAMIC RANGE FOR HEAD-MOUNTED DISPLAY DEVICE

BACKGROUND

Head-mounted display devices include multiple screens (usually two) for providing stereoscopic vision to a user. A graphics processing unit renders two slightly different images from a perspective difference corresponding to the difference in perspective between the two eyes of a user and provides those images to the head-mounted display device for display. Improvements into technology related to head-mounted display devices are constantly being made.

BRIEF DESCRIPTION OF THE DRAWINGS

A more detailed understanding can be had from the following description, given by way of example in conjunction with the accompanying drawings wherein.

DETAILED DESCRIPTION

Presented herein are techniques for adjusting the intensity values of images to be displayed on a stereoscopic head mounted display. These techniques improve the perceived dynamic range of the head mounted display by dynamically adjusting the pixel intensities (also known generally as "exposure") of the images presented on the head mounted display based on a detected gaze direction. The head mounted display includes an eye tracker that is able to sense the direction of the gaze of the eyes. The eye tracker, head mounted display, or a processor of a computer system receives this information, determines an intersection point of the eye gaze and a screen within the head mounted display and identifies a gaze area around this intersection point. The gaze area is the area around the intersection point.

Using this gaze area, the processing system adjusts the pixel intensities of an image displayed on the screen. The adjustments are made based on the intensities of the pixels within the gaze area of an image. Any technically feasible technique for making such adjustments is possible. In general, such a technique should adjust the intensities of the pixels within the gaze area such that pixels within the gaze area are represented with "optimal contrast," where the term "optimal contrast" means that intensity excursions above and below the average intensity of the pixels in the gaze area are mapped to a range of intensities of the screen that does not extend beyond the minimum or maximum range of intensities that the screen can display.

One example technique for adjusting intensity is as follows. The processing system first generates an image for display. The processing system identifies the gaze area based on the eye tracker. The processing system calculates minimum and maximum intensity values of the pixels within the gaze area. The processing system maps the minimum intensity value to a low intensity value of the screen and maps the maximum intensity value to a high intensity value of the screen. The processing system also maps the intensities of the pixels in the image that are between the maximum and minimum intensity to intensity values of the display that are in between the low and high intensity values.

Generally, the mapping is performed such that intensity values of the image that are higher are mapped to higher intensity values of the screen. In other words, if a first intensity value of the image is lower than a second intensity value of the image, then the intensity value on the screen mapped to the first intensity value is lower than the intensity value on the screen mapped to the second intensity value. In one example, interpolation, such as linear interpolation, is used to map intermediate values to intensity values of the screen. Any other technique for mapping such intermediate values to intensity values of the screen may be used. The mapping is performed for all pixel values in the image, rather than just for pixels within the gaze area. For intensity values outside of the gaze area that are below the minimum value of the gaze area, these intensity values are mapped to intensity values of the screen that are less than or equal to the low intensity value of the screen. For intensity values of the image that are greater than or equal to the maximum intensity value in the gaze area, these intensity values are mapped to intensity values of the screen that are greater than or equal to the high intensity value of the screen.

Note, these mappings may result in intensity values outside of the gaze area that are very under-exposed or very over-exposed. However, since the eye is not fixated on locations outside of the gaze area, in many situations, the user may not notice the under- or over-exposed areas. After a mapping has been performed, the processing system adjusts the intensity values of the pixels of the image for display based on the mapping. In one example, the low and high intensity value of the screen are the lowest and/or highest possible intensity values of the screen, while in other examples, the low intensity value, the high intensity value, or both, are above or below the lowest and highest possible intensity values of the screen, respectively.

In an example, the processing system detects saccades by determining whether the eye movement is above a saccade velocity threshold, although any other technically feasible technique for detecting a saccade is possible. If a saccade is detected, the processing unit does not update intensity values for at least one frame during the saccade. In one example, during the saccade, the processing unit determines a predicted landing position for the saccade—i.e., a predicted position on which the gaze point will fixate when the saccade ends. Also, in an example, during the saccade, the processing unit determines intensity value updates for the image that will exist at the end of the saccade. In an example, this determination is done as follows. In addition to predicting the landing position, the processing unit also generates a predicted image for when the saccade ends. In one example, the processing unit determines the predicted image by calculating motion vectors for an image generated prior to the end of the saccade and applies the motion vectors to the image generated prior to the end of the saccade to generate a predicted image. In an example, applying the motion vectors to the previously-generated image includes shifting the previously-generated image by amounts dictated by the motion vectors to generate the predicted image. The processing system examines the pixels of the predicted image within the predicted gaze area and generates mappings between the intensities of that image and the intensities of the screen in the head mounted display. In one example, when the image at the end of the saccade is actually rendered, the processing system applies the determined mappings to that image to generate a modified image. In another example, the mappings are utilized during the rendering of that image to generate the image having pixel intensities set according to the mappings. As the mappings are used during rendering in this example, post-processing work (e.g., in a display controller, which comprises hardware, software, or a combination thereof that is configured to interpret an image and generate signals to be output to a display so that the image is displayed on the display) is not needed for pixel intensity adjustment according to the determined mappings. One purpose of using a predicted image and a predicted saccade landing position is to reduce the processing load on the processing system during a saccade. Another purpose of using the predicted image and predicted saccade landing position is to efficiently tone map the image to be displayed at the end of the saccade.

By adjusting the intensities of images displayed on the screens of head-mounted displays, according to statistics (e.g., pixel intensities) within a gaze area, and not according to statistics (e.g., pixel intensities) outside of the gaze area, a perceived dynamic range of the device is increased. More specifically, because the image is adjusted dynamically such that the pixels under the gaze of a user fall within a "comfortable" intensity range of the screen, the perceived dynamic range of the screen is increased as compared with a situation in which the image on the screen is not adjusted or is adjusted according to statistics (e.g., pixel intensities) of the entire image or substantially the entire image.

Figure 1:
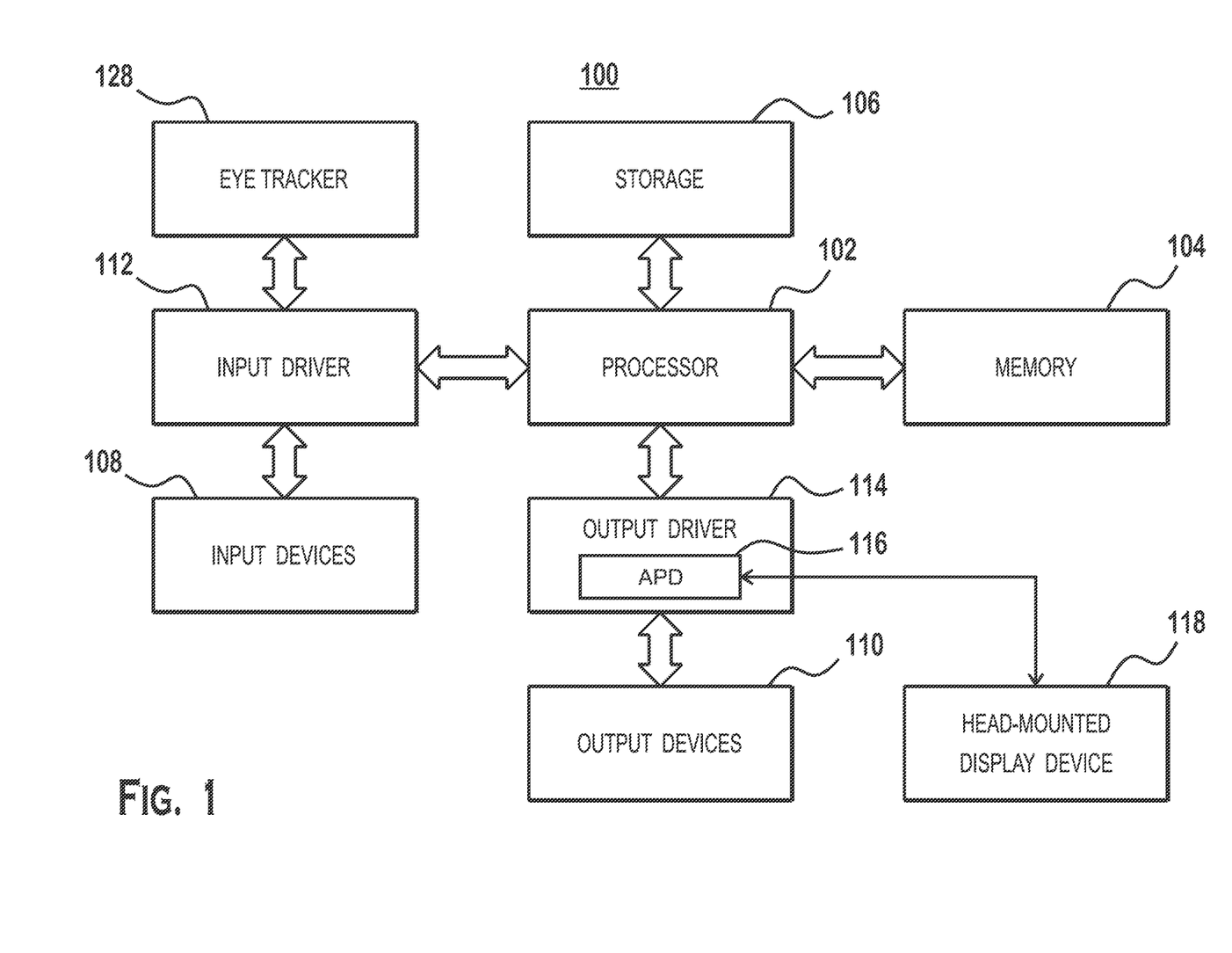
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, an eye tracker 128, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a head-mounted display device ("HMD") 118. The HMD 118 includes screens for providing stereoscopic vision to a user. The HMD 118 also includes an eye tracker 128 for determining the direction in which the eye of a user is looking. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
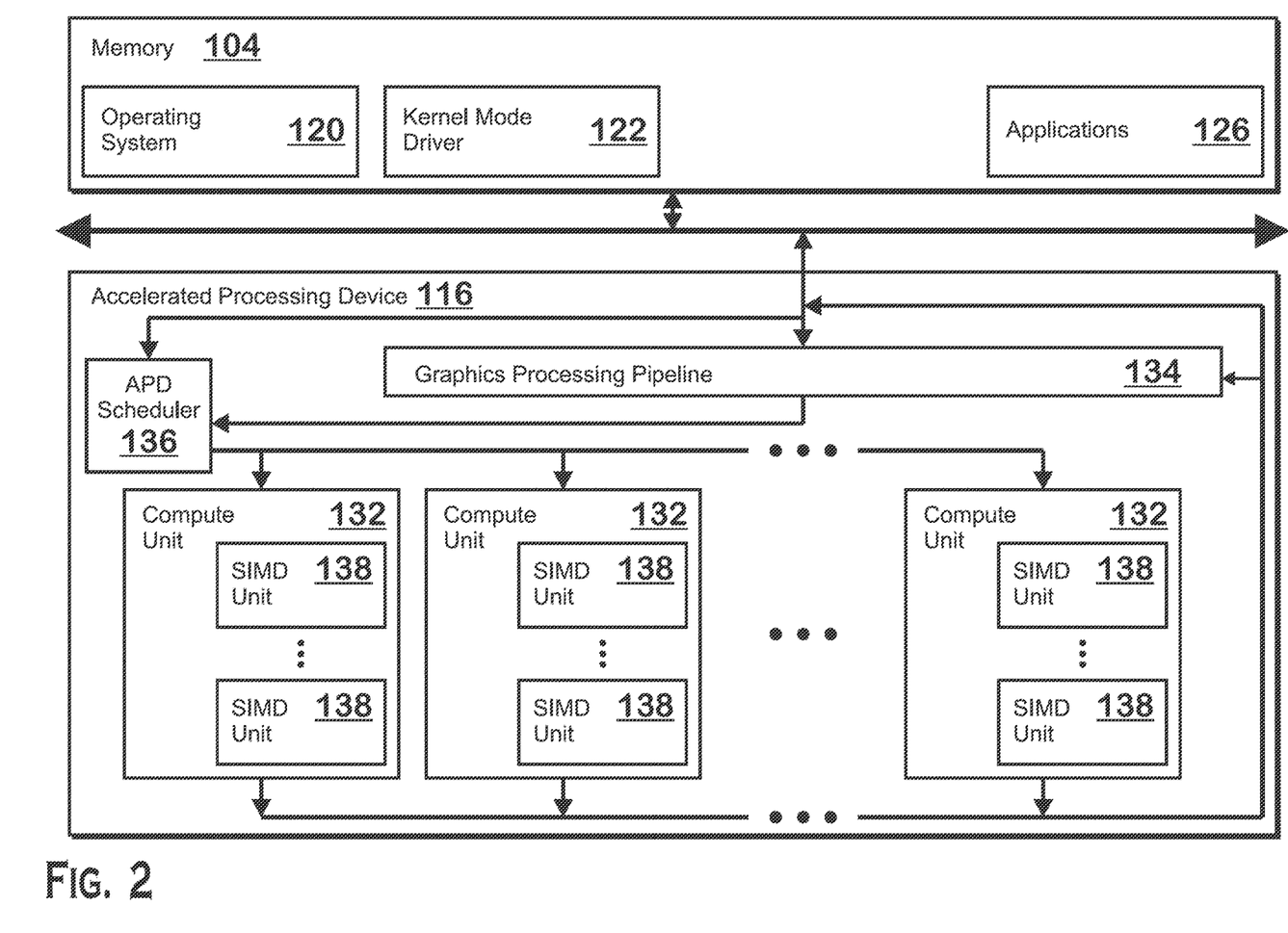
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
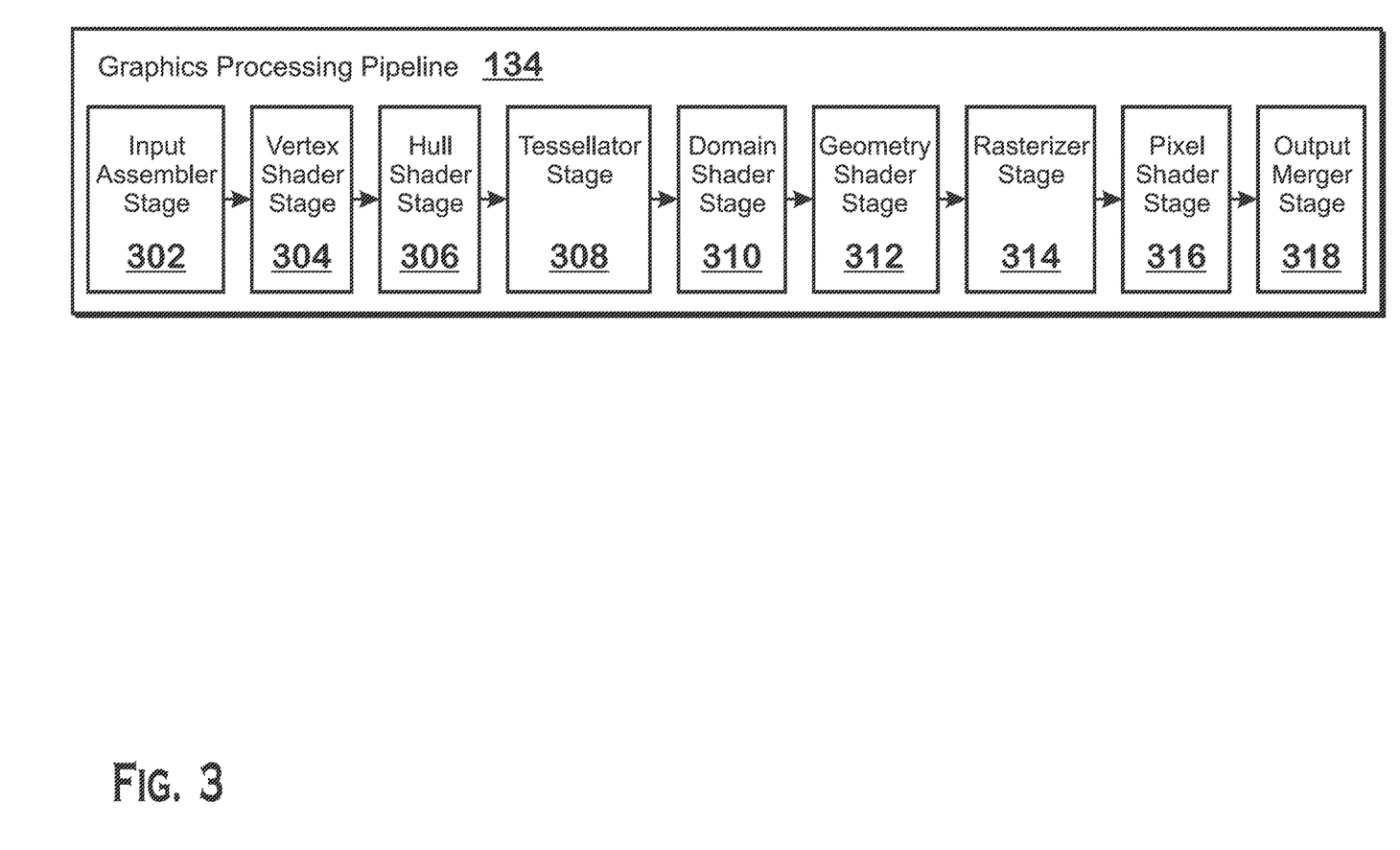
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Figure 4:
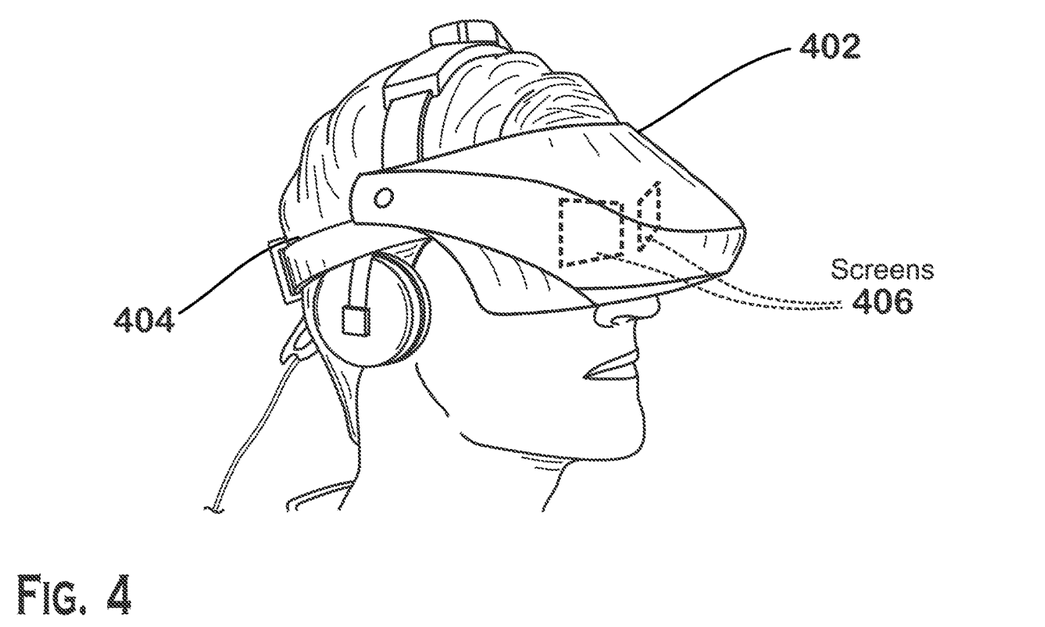
FIG. 4 illustrates the head mounted display that provides virtual reality vision to a user, according to an example.

FIG. 4 illustrates the head mounted display ("HMD") 118 that provides virtual reality vision to a user, according to an example. The HMD 118 is illustrated as mounted on the head 404 of the user. Two screens 406 are illustrated that provide stereoscopic vision. Specifically, each screen 406 provides slightly different views ("stereo images") to generate three-dimensional vision. In an example, the APD 116 generates images for the different screens 406 by rendering the same three-dimensional scene twice, with each time being rendered using cameras of different positions corresponding to the location disparity of the eyes of the user. Any other technically feasible techniques for producing these stereo images may be used.

Figure 5:
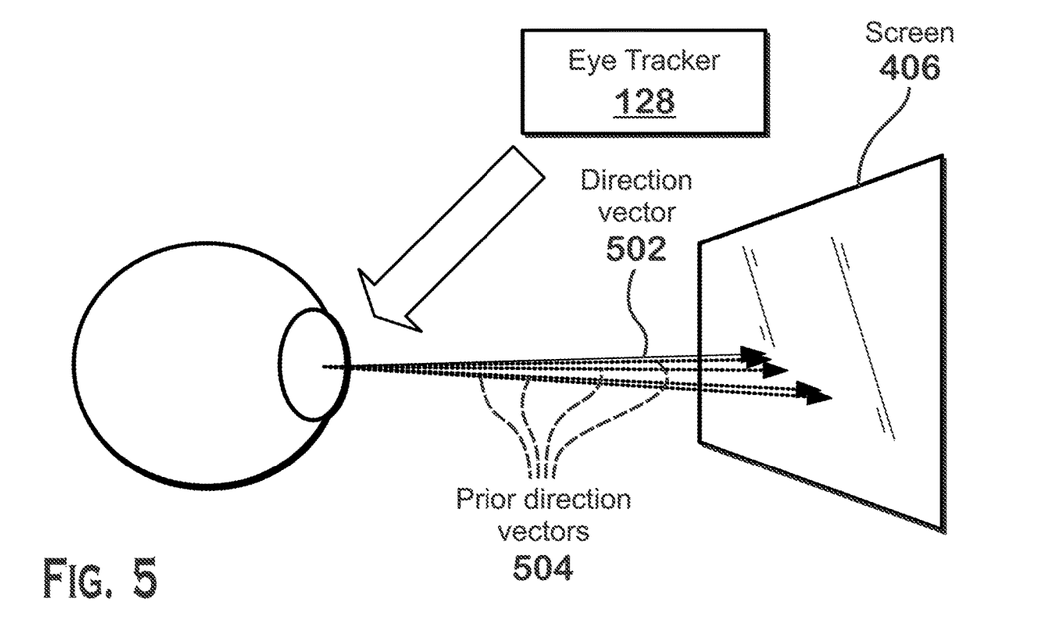
FIG. 5 illustrates eye tracking functionality of the head-mounted display, according to an example.

FIG. 5 illustrates eye tracking functionality of the HMD 118, according to an example. As described with respect to FIG. 1, the HMD 118 includes an eye tracker 128. The eye tracker 128 senses the position and orientation of either or both eyes of the user within the HMD 118. The eye tracker 128 outputs a direction vector 502 for either or both of the eyes. Each direction vector indicates the direction and position of the gaze of the corresponding eye. The direction vector 502 includes both a position (point of origin) and a direction so that the direction vector 502 can indicate a point of intersection with the screen 406. The system 100 (e.g., the processor 102 or APD 116) uses this position of the direction vector 502 position and the direction of the direction vector 502 to identify the point of intersection of the direction vector 502 with the screen 406. The system 100 identifies a point in the image displayed on the screen 406 that the eye is looking at based on the identified point in the screen 406. The direction portion of the direction vector 502 is also useful to identify a position and direction of view into a three-dimensional scene from which the image is generated, as described in more detail below. FIG. 5 illustrates several prior direction vectors 504. These prior direction vectors 504 represent direction vectors detected before the most recent direction vector 502 is detected. Several prior detection vectors 504 are illustrated. It can be seen from these prior detection vectors 504 that the gaze of the eye has moved across the screen 406. Note, the timing of direction vector detection does not need to be synchronizing with the display of frames on the screen 406. For example, direction vectors indicating position and direction of eye gazes may be detected more frequently than frames are displayed on the screen 406, and at times that are different than the times at which frames are updated on the screen 406. The APD 116 or other unit may reconcile timing of the direction vectors utilizing timestamps associated with the direction vectors that indicate the time at which the direction vectors are captured.

The human eye is typically capable of real-time light sensitivity adjustments to achieve a very wide dynamic range (of the equivalent of over 20 f-stops or over 1,000,000:1). The display technology, such as that found in the screens 406 of the HMD 118, typically has a dynamic range much lower than that of the human eye. Techniques used in head-mounted displays to reduce motion artifacts, including blacking out the displayed images for a certain amount of time each frame (effectively reducing the shutter speed), may further reduce the dynamic range of such displays. Thus, the HMD 118 can be viewed as having a "low" dynamic range as compared with that of the human eye.

To compensate for this low dynamic range, the system 100 (e.g., the processor 102 or APD 116) dynamically tone maps the images displayed based on the direction vectors 502. More specifically, before transmitting the image to the HMD 118 for display, the system 100 determines gaze areas of the image as the area of pixels situated around the point of intersection of the direction vectors 502 and the screens 406. The system 100 adjusts the image such that the portion of the image within a gaze area has intensity levels appropriate for the dynamic range of the screens 406 of the HMD 402. Pixels from the screens for one or both eyes may be used in determining what adjustments to apply. Many techniques for adjusting the intensities of the image according to the intensities of the pixels in the gaze area are possible. In one example, the intensities of the pixels within the gaze are set such that the average intensities of the pixels in the gaze are equal to or within a threshold percentage of the average intensity of the display. In another example, the APD 116 receives intensity adjustments and applies those intensity adjustments to the frame being rendered by the graphics processing pipeline 134. For example, the pixel shader stage 316 determines pixel color values for pixels as normal, but also applies the intensity adjustments determined based on the gaze areas. Any technically feasible technique for applying the pixel intensity adjustments may be utilized.

Note, the gaze areas used for adjusting brightness may include the gaze area of one eye or of both eyes. In the situation that the gaze areas for both eyes are used, adjustments are determined based on some combination of the pixel intensities of the gaze areas from both eyes. In various examples, the combination of pixel intensities are the union of pixel intensities from the gaze areas of both eyes, the intersection of pixel intensities from the gaze areas of both eyes, or any other technically feasible combination of data from the gaze areas.

Figure 6:
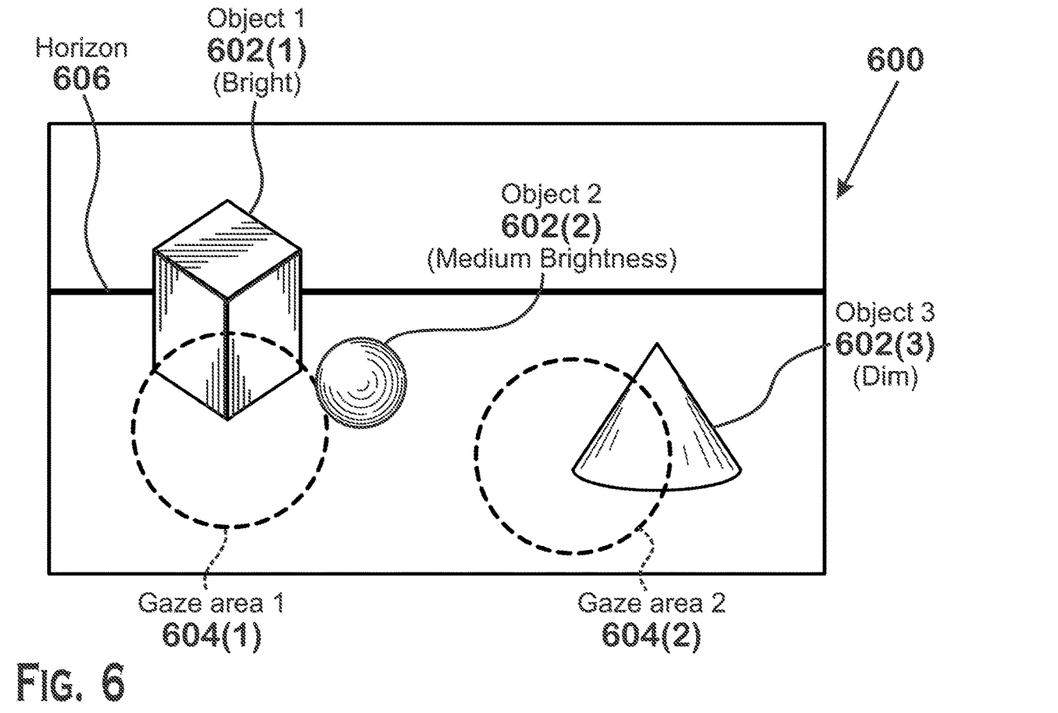
FIG. 6 illustrates an example scene for which an image is displayed in the head-mounted display.

FIG. 6 illustrates an example scene 600 for which an image is displayed in the HMD 118. The scene 600 includes three objects 602. Two gaze areas 604 are illustrated—a first gaze area 604(1) which includes a portion of object 1 602(1) and a second gaze area 604(2) which includes a portion of object 3 602(3). The gaze areas 604 represent portions of the scene 600 that an eye is determined to be fixated on. The fact that two gaze areas 604 are illustrated reflects that the eye can move. In one example, gaze area 1 604(1) is associated with the position of an eye at a first time and gaze area 2 604(2) is associated with the position of an eye at a second, later time.

According to the lighting of the scene 600, object 1 602(1) is a bright object, object 2 602(2) has medium intensity, and object 3 602(3) is a dim object. These intensities represent relative intensities such that no matter how the intensities of the pixels of the image are adjusted after rendering the objects 602, object 1 602(1) will be brighter than object 2 602(2), which will be brighter than object 3 602(3). In addition, these intensities represent intensities relative to an average intensity of the scene. More specifically, the pixels of the bright object 602(1) are brighter than an average of the intensities of all pixels of the scene 600 and the pixels of the dim object 602(3) are dimmer than an average of the intensities of all pixels of the scene 600. The description of intensity of a scene 600 is for a "baseline" rendering of the scene 600. This scene intensity can be adjusted to be brighter or dimmer (e.g., such that dim objects become brighter or bright objects become dimmer). In addition, the scene can be tone mapped, which means that relative intensities between pixels can be adjusted.

When the eye tracker 128 detects that the eye is fixated on gaze area 1 604(1) (or any other gaze area 604), the system 100 adjusts the intensities of the image based on the intensities of the pixels within gaze area 1 604(1) (or whichever gaze area 604 the eye is determined to be fixated on). Specifically, the system 100 adjusts the intensity of the scene 600 so that the intensities of the pixels within gaze area 1 604(1) are "appropriate" for the dynamic range of the screen 406 on which those pixels are displayed. "Appropriate" means that the intensities are adjusted according to one of a set of algorithms for adjusting intensities to be appropriate for dynamic range. In one example, the intensities of the pixels within gaze area 1 604(1) are set so that the average intensity of such pixels is the closest, out of the intensity of all pixels in gaze area 1 604(1), to the average display intensity of the screen 406. In this way, the intensities of the pixels in gaze area 1 604(1) are able to span a wide range of intensities of the screen 406.

In one additional example technique, the intensities of the pixels in gaze area 1 604(1) are "spread out" in order to take advantage of the full dynamic range of the screen 406 or of some large portion (e.g., 50%) of the dynamic range of the screen 406. In one example, spreading out the intensities of the pixels includes determining maximum and minimum intensities of the pixels in gaze area 1 604(1), and calculating, for each pixel in gaze area 1 604(1), a ratio between: the difference of the intensity of the pixel and the minimum intensity of a pixel in gaze area 1 604(1); and the difference between the maximum and minimum intensities of the pixels in gaze area 1 604(1); and using that ratio to determine the intensity for that pixel within the screen 406. More specifically, the ratio would correspond to a particular intensity level between the minimum and maximum intensities of a chosen range. Intermediate values (those between minimum and maximum intensities) of pixels within the gaze area may be interpolated to intensity values of the screen 406, for example, in a linear interpolation technique, or according to some other type of interpolation. Any other technically feasible means for mapping intermediate intensity values of pixels within the gaze area to intensity values of the screen 406 may be used.

Additional examples for mapping intensities of pixels of an image to intensities of pixels of the screen 406 are now provided by way of further explanation and example. In one example, a technique to map pixel intensities of pixels within the gaze area would cause the range of intensities of the pixels within the gaze area 604(2) to occupy a range of the available intensities of the screen 406 that is above a threshold percentage of the total available intensities of the screen 406. In a non-limiting example, the intensities of the pixels in the gaze area 604 are mapped to 50% of the range of possible intensities of the screen 406. In other words, the intensities of all of the pixels in the gaze area are adjusted such that the pixels in the gaze area are displayed utilizing a range of intensity values of the screen 406 that includes 50% of the possible intensities of the screen 406. Note that this given percentage value is for example purposes only and should not be read to be limiting. In another example, outlier intensities in the gaze area 406 may be mapped to intensity values of the screen 406 that are outside of the threshold percentage of the total available intensities of the screen 406, while non-outlier intensities are mapped to the threshold percentage of intensities of the screen 406. An outlier may be defined in any technically feasible manner. In one example, an outlier is a threshold percentage below or above the second lowest or second highest intensity of pixels in the gaze area.

In one example, the minimum intensity of the pixels in the gaze area 2 604(2) is mapped to a low intensity value of the screen 406 (which low intensity value can be the lowest possible intensity of the screen 406 or an intensity a threshold level higher than the minimum intensity of the screen 406, such as 10% from the minimum intensity of the screen 406 to the maximum intensity of the screen 406) and the maximum intensity of the pixels in the gaze area 2 604(2) is mapped to a high intensity value of the screen 406 (such as the highest possible intensity or a threshold percentage, such as 10%, from the highest intensity of the screen 406). Any technique for mapping intermediate values (values between the maximum and minimum intensity of the pixels in the gaze area 604(2) to the intensities of the screen 406) may be used. Any other technically feasible technique for mapping the intensity levels of the pixels within gaze area 1 604(1) to the range of intensity levels possible on the screen 406 is possible as well.

When the system 100 detects that the eye moves to gaze area 2 604(2), the system 100 adjusts the scene 600 so that, instead of the scene being adjusted in intensity for gaze area 1 604(1), the scene is adjusted in intensity for gaze area 2 604(2). This adjustment is done in a similar manner as with respect to the adjustment for gaze area 1 604(1). More specifically, the intensities of the pixels within gaze area 2 604(2) are adjusted to be "appropriate" for the dynamic range of the screen 406 on which the scene 600 is displayed, where "appropriate" means that objects within the gaze area appear on the screen 406 with "optimal contrast." As described above, any technically feasible technique for mapping the intensities of the gaze area 2 604(2) to the intensities available in the screen 406 may be used.

Any technically feasible technique for adjusting the intensity of an image rendered by the graphics processing pipeline 134 is possible. In one example, the graphics processing pipeline 134 renders an image normally. Subsequently, the image is provided to the graphics processing pipeline 134 in a tone mapping pass that adjusts the intensity values of the image based on the intensities of the pixels in the gaze area 604. In such an example, the graphics processing pipeline 134 receives data describing the gaze area from the processor 102, identifies the intensity levels within the gaze area in the rendered image, and modifies the pixels of the rendered image based on the intensities as described above. In another example, the above operations are performed by a display controller (not shown) which is a component that reads the image for a frame from the frame buffer and provides the image to the HMD 118 for display. In such a scenario, the display controller reads the pixels of the image rendered by the graphics processing pipeline 134, receives an indication of the gaze area from the processor 102 or from another entity, modifies the intensities of the pixels of the image based on the location of the gaze area and the intensities of the pixels within the gaze are, and outputs the modified image to the HMD 118 for display. In another example, intensity adjustments are fed to the pixel shader stage 316, which applies the intensity adjustments to the pixels that would otherwise be generated by the pixel shader stage 316. In one example, the instructions of the pixel shader program are modified or augmented to include instructions that modify the intensities of the pixels according to the adjustments described herein. In another example, the application that provides the pixel shader includes instructions within that pixel shader that take into account the pixel intensity adjustments described elsewhere herein. Any other technically feasible technique for adjusting the intensities of the images produced by the graphics processing pipeline 134 to account for the gaze area can be implemented as well.

The above changes in intensity levels may be performed either continuously—that is—for every frame, or less frequently than once every frame. In certain situations, changes in intensity levels are determined and applied not on every frame when a type of eye movement known as a saccade is detected. A saccade is a rapid eye movement where the velocity of the eye movement is above a saccade threshold. During such saccades, the human visual system is suppressed (in a phenomenon referred to as "saccadic masking"), causing perceived changes in the scene to be attenuated. Normal visual perception resumes upon completion of the saccade.

In some implementations, during saccades, the system 100 does not update intensity levels for the scene for at least one frame. This reduction in intensity level updates may benefit one or more processing units of the system 100, such as the processor 102, the APD 116, or another processing unit, by reducing the amount of work required for processing such intensity level updates, thereby freeing up processing resources for other tasks.

Figure 7:
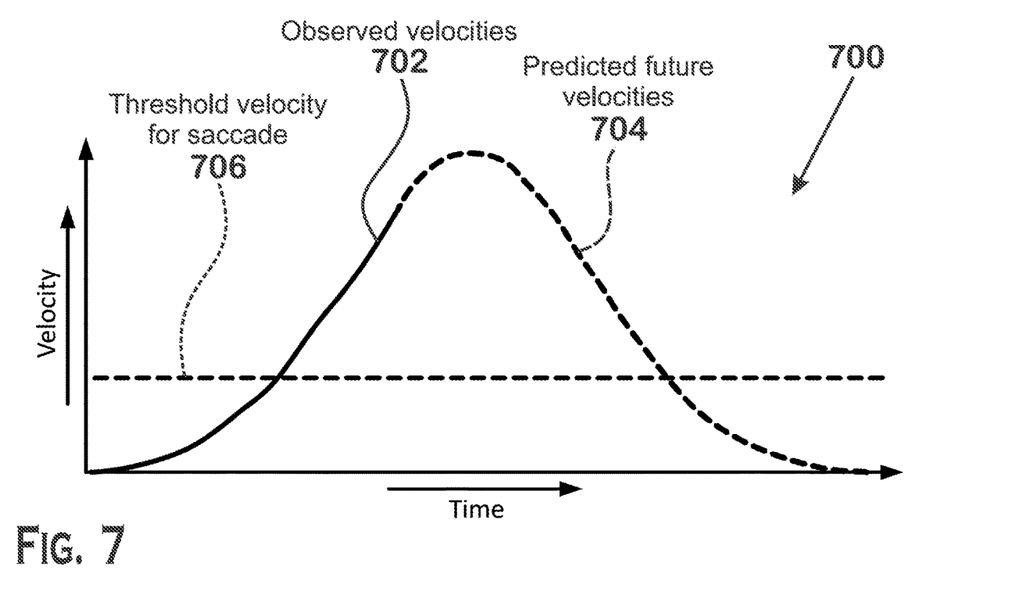
FIG. 7 is a graph illustrating measured eye movement velocities versus time, according to an example.

FIG. 7 is a graph 700 illustrating measured eye movement velocities versus time, according to an example. Specifically, the measured velocities are illustrated as observed velocities 702, shown as a solid line, and predicted future velocities 704, shown as a dotted line.

The graph 700 illustrates several aspects of eye tracking related to saccades. Specifically, the graph 700 is illustrated as velocity versus time. In one example, the system 100 (e.g., the eye tracker 128 or the processor 102) calculates velocity as the derivative of eye tracking position—the location in the scene at which the gaze intersects the screen 406—with respect to time. In another example, the system 100 calculates instantaneous velocity for each eye tracking measurement by dividing the distance between time-adjacent measurements by the time between such measurements.

Graph 700 also illustrates one example technique by which the system 100 (e.g., the eye tracker 128 or the processor 102) detects a saccade. Specifically, in this example, upon detecting that the velocity of eye movement is above a saccade velocity threshold, the system 100 determines that a saccade occurs. Note that although this example technique for detecting a saccade is provided, any other technically feasible technique for detecting a saccade is possible and falls within the scope of the present disclosure. Graph 700 also illustrates an example technique for predicting a "landing position" for the eye post-saccade. This "landing position" represents the location of the gaze at the end of the saccade.

In various examples, the system 100 (e.g., the processor 102) predicts what the landing position will be at the end of the saccade, so that the system 100 can perform intensity level adjustment for the gaze area associated with the predicted landing position. Aspects of a technique for predicting the landing position are now provided.

To predict the landing position, the system 100 obtains measurements of the velocity of the eye. These obtained measurements are illustrated as "observed velocities 702" in FIG. 7. Once a sufficient number of observed velocities are obtained and once the system 100 has determined that a saccade is being performed, the system 100 determines a predicted landing position for the eye. In one example, a "sufficient number" of observed velocities means a pre-defined threshold number of velocities measured after, before, or around the time that a saccade is detected by detecting that velocity has increased above a threshold. In one example, a "sufficient number" means a pre-defined number of velocities have been measured prior to the threshold velocity for the saccade being detected. In another example, a "sufficient number" means a pre-defined number of velocities after the threshold velocity for the saccade is detected. In yet another example, a "sufficient number" means a threshold number of velocities detected before and after the threshold velocity for the saccade is detected. In an alternative, the system 100 does not determine that a sufficient number of velocities has been detected, but predicts the landing position for a saccade once the system 100 has determined that a saccade has occurred by detecting that the eye has increased above the threshold velocity for the saccade 706. At this point, it is assumed that a sufficient number of velocity measurements have been collected.

The system 100 determines a predicted landing position based on the velocity measurements collected. A variety of techniques for predicting landing position are discussed in the paper "Saccade Landing Position Prediction for Gaze-Contingent Rendering," by Elena Arabadzhiyska, Okan Tarhan Tursun, Karol Myszkowski, Hans-Peter Seidil, and Piotr Didyk, in the publication "ACM Transaction on Graphics," Volume 36, No. 4, Article 50, published in July 2017, and available at http://pdf.mmci.uni-saarland.de/projects/SaccadeLandingPrediction/files/Saccade_Landing_Position_Prediction_for_Gaze-Contingent_Rendering.pdf, the entire contents of which are hereby incorporated by reference herein. The graph 700 in FIG. 7 presents a rough, general conceptual outline that corresponds to at least some techniques for predicting a landing position. More specifically, the combination of the observed velocities 702 and the predicted future velocities 704 is shown as a particular graph shape. In various techniques, this graph shape represents an expected graph shape for eye velocities during a saccade. In other words, this graph shape depicts the expected sequence of velocities that would occur during a saccade. It can be expected that a certain sequence of velocities occur because the eye moves in a similar way during each saccade. The specific graph shape for specific individual saccades may vary based on the distance traveled during the saccade and may vary from person to person, but the overall graph shapes for saccade velocity will generally be predictable. Predicting landing position involves the matching a graph shape to the observed velocities 702 and then determining what the position will be after the eye moves based on all velocities in the predicted future velocities 704 (i.e., at the right side of graph 700).

The system 100 uses the predicted landing position to calculate pixel intensity adjustments for the image being shown based on the gaze area 604 at the predicted landing position. Specifically, as described with respect to FIG. 6, the system 100 analyzes the image that would be displayed at the time corresponding to when the eye would arrive at the predicted landing position, determining a gaze area corresponding to the landing position within that image. The system 100 then adjusts intensity for the image based on the gaze area 604 as described with respect to FIG. 6. As described above, in some examples, the system 100 waits to perform the intensity adjustments until the saccade actually ends, due to saccadic masking.

In one example, the system 100 obtains the image that would be displayed at the time corresponding to when the eye would arrive at the predicted landing position by utilizing motion vectors. More specifically, the system 100 calculates individual motion vectors, each associated with different groups of pixels of previously calculated images. The motion vectors indicate a predicted motion across the image between frames. The system 100 applies the motion vectors to the most recently rendered image to generate a predicted image that is similar in pixel intensities to the yet-to-be rendered image that will actually be displayed at the time that the saccade ends. The system 100 analyzes the intensities of the pixels within the predicted gaze area associated with the predicted landing position, of the predicted image, to determine intensity adjustments based on the gaze area. As described above, the intensity adjustments are determined based on the pixel intensities within the gaze area. The system 100 applies the determined intensity adjustments to the image actually produced for the frame that is rendered when the saccade ends. Prediction of the saccade landing position and the intensity adjustments does not remove the need to render this frame. However, by determining which intensity adjustments are to be made before the saccade ends, such intensity adjustment calculations are avoided between the time that the frame begins rendering and the time that the frame is displayed to the HMD 118, thus reducing processing load on the APD 116, processor 102, or other processing entity of the system 100 that determines intensity adjustments.

Note that although prediction is described as being used when saccades occur, in some examples, the system 100 also uses prediction when saccades do not occur. More specifically, when a saccade is not occurring, the system 100 determines a predicted gaze point for the time that the next frame will be displayed by extrapolating movement of the eye and determines a predicted image associated with the next frame utilizing motion vectors as described above. Then, based on the predicted gaze point and predicted image, the system 100 calculates pixel intensity adjustments as described above. When the image is actually rendered, the system 100 applies the calculated pixel intensity adjustments. This type of prediction-based adjustment reduces latency associated with the sequence of operations that includes detecting an eye movement, calculating intensity adjustments based on that eye movement, and adjusting intensities of an image based on the intensity adjustments.

Figure 8:
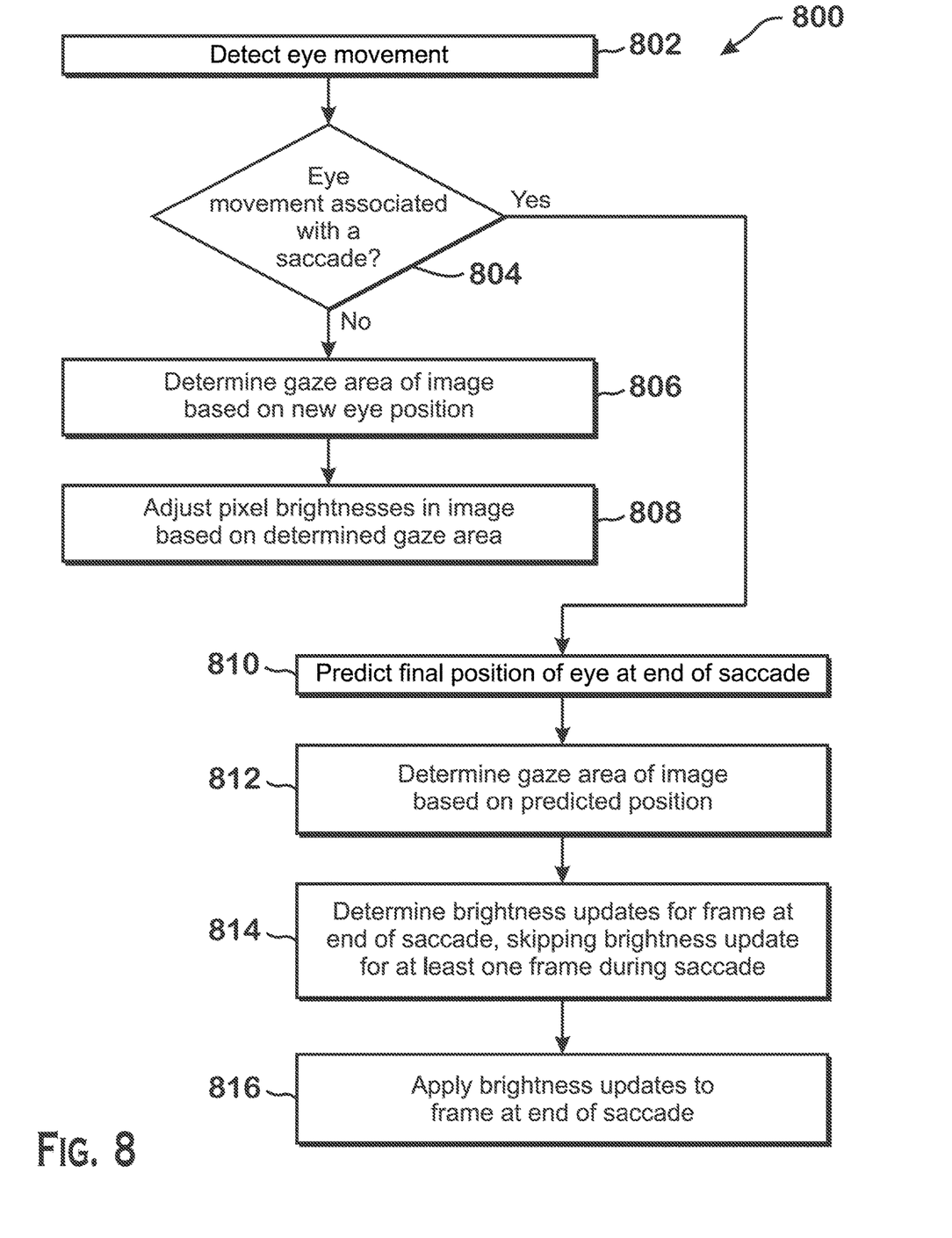
FIG. 8 is a flow diagram of a method for adjusting intensity to account for gaze position, according to an example.

FIG. 8 is a flow diagram of a method 800 for adjusting intensity to account for gaze position, according to an example. Although described with respect to the system of FIG. 1-7, those of skill in the art will understand that any system configured to perform the method with any technically feasible order of steps falls within the scope of the present disclosure.

As shown, method 800 begins at step 802, where the eye tracker 128 of a head mounted display 402 detects a change in eye position. The eye tracker 128 forwards data indicative of this detection to the processor 102. At step 804, the processor 102 determines whether the eye movement detected is associated with a saccade. As described above, an eye movement is associated with a saccade if the velocity of the eye movement is above a saccade detection threshold. If the eye movement is associated with a saccade, then the method 800 proceeds to step 810 and if the method 800 is not associated with a saccade, then the method 800 proceeds to step 806.

At step 806, the processor 102 determines a gaze area within an image being displayed based on the newly detected eye position. In an embodiment, the gaze area is circular or roughly circular and is centered around the point in the image corresponding to the point of intersection of the direction vector of the newly detected eye position and the screen 406. At step 808, the processor 102, APD 116, and/or another entity such as the display controller, adjusts the pixel intensity of the image based on the determined gaze area. As described above, for example, with respect to FIG. 6, adjusting the pixel intensities may be performed by the processor 102, the APD 116, or the display controller, or by multiple such units working in conjunction. Many examples of adjusting pixel intensity based on gaze area are described above. After step 808, the method 800 ends.

At step 810, which occurs if the eye movement is determined to be associated with a saccade at step 804, the processor 102 predicts the final position of the eye at the end of the saccade. Techniques for performing such a prediction are described above, for example, with respect to FIG. 7. At step 812, the processor 102 determines a gaze area of the image based on the predicted eye position. At step 814, the processor 102 or another entity such as the display controller or the APD 116 determines intensity updates for the frame at the end of the saccade. In one example, the entity skips determining intensity updates for at least one frame during the saccade. Techniques for determining the intensity during a saccade are provided above, for example, with respect to FIG. 7. At step 816, the display controller or APD 116 applies the determined intensity updates to the frame at the end of the saccade.

Some of the steps of FIG. 8 are described as being performed by the processor 102. In various alternatives, such steps are performed all by the processor 102, all by the APD 116, or some by the processor 102 and some by the APD 116. In various alternatives for step 802, an entity within the APD 116 or another entity of the system 100 performs step 802. In various examples, the APD 116 interfaces directly with the eye tracker 128 to obtain the gaze-related measurements for step 802. In an alternative, the processor 102 is connected to the eye tracker 128 and obtains the gaze-related measurements for step 802.

In various alternatives for step 804, the processor 102 performs step 804, determining whether the eye movement is associated with the saccade, a processing entity of the APD 116, such as a microcontroller (not illustrated in a figure), an application-specific integrated circuit ("ASIC") (also not illustrated in a figure), a compute shader executing on the APD 116, or another entity, determines whether the eye movement is associated with a saccade (step 804). In a similar manner, in various examples, any of steps 806, 810, 812, and 814 are performed by any of the processor 102 or a component of the APD 116 mentioned above in this paragraph (e.g., a microcontroller, an ASIC, a compute shader, or another entity of the APD 116). In various examples, steps 808 and 816 are performed by either of the APD 116 (such as in the pixel shader stage 316) or a display controller (not illustrated in a figure) in a manner described above. In another example, all of method 800 could be implemented in software executing on a single one of, or multiple ones of, any component of system 100, such as processor 102, APD 116, or any other component.

Note that although the display on which images are being displayed is described and shown as the head-mounted display 118, any type of display may be used instead, including displays that are not head mounted and/or used for virtual reality.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for adjusting intensity for a display, the method comprising:
    detecting an eye movement and determining that the eye movement is associated with a saccade;
    skipping determining intensity adjustments for at least one frame to be displayed during the saccade;
    predicting a final position of the eye at the end of the saccade;
    determining a gaze area for a screen associated with the display, the gaze area being at the predicted final position of the eye;
    determining a predicted image to be displayed when the saccade ends by determining motion vectors for an image rendered by a graphics processing pipeline and applying the motion vectors to the image rendered by the graphics processing pipeline to produce the predicted image;
    determining intensity adjustments for pixels within the gaze area based on a comparison of the screen intensities mapped to the intensities of the pixels in the gaze area and the dynamic range of the screen, wherein the intensity adjustments are determined based on the predicted image, and wherein the dynamic range of the screen comprises a range of possible intensities of the screen; and
    applying the intensity adjustments to pixels within an image to be displayed on the screen.

2. A method for adjusting intensity for a display, the method comprising:
    detecting an eye movement;
    determining a gaze area for a screen associated with the display, the gaze area being at the end point of the eye movement, wherein determining the gaze area comprises identifying an approximately circular area around a point of intersection of a gaze direction vector, detected for the eye movement, and the screen;
    determining intensity adjustments for pixels within the gaze area based on a comparison of the screen intensities mapped to the intensities of the pixels in the gaze area and the dynamic range of the screen, wherein the dynamic range of the screen comprises a range of possible intensities of the screen; and
    applying the intensity adjustments to pixels within an image to be displayed on the screen.

3. A method for adjusting intensity for a display, the method comprising:
    detecting an eye movement;
    determining a gaze area for a screen associated with the display, the gaze area being at the end point of the eye movement;
    determining intensity adjustments for pixels within the gaze area based on a comparison of the screen intensities mapped to the intensities of the pixels in the gaze area and the dynamic range of the screen, wherein the determining of the intensity adjustments comprises generating mappings between the intensities of pixels for display when the eye is fixated on the gaze area and the intensity range of the screen, and wherein the dynamic range of the screen comprises a range of possible intensities of the screen; and
    applying the intensity adjustments to pixels within an image to be displayed on the screen.

4. The method of claim 3, wherein applying the intensity adjustments to the pixels within the image comprises:
    adjusting the intensities of pixels of an image to be displayed when the eye is fixated on the gaze area based on the mappings.

5. The method of claim 3, wherein generating the mappings comprises:
    determining a maximum intensity for pixels within the gaze area and a minimum intensity for the pixels within the gaze area;
    mapping the minimum intensity to a low intensity value for the display and mapping the maximum intensity to a high intensity value of the display; and
    mapping intensities of the pixels within the gaze area between the minimum intensity and the maximum intensity to intensities of the display between the low brightness value of the display and the high brightness value of the display.

6. A system for adjusting intensity for a display including an eye-tracker, the system comprising:
    a processor configured to issue graphics processing commands;
    an accelerated processing device ("APD") configured to process the issued graphics processing commands to generate an image for display; and
    a display controller configured to provide image display signals to a display based on the generated image,
    wherein either or both of the processor or the APD is configured to:
    receive an indication of a detected eye movement and determine that the eye movement is associated with a saccade,
    skip determining intensity adjustments for at least one frame to be displayed during the saccade;
    predict a final position of the eye at the end of the saccade,
    determine a gaze area for a screen associated with the display, the gaze area being at the predicted final position of the eye determine a predicted image to be displayed when the saccade ends by determining motion vectors for an image rendered by a graphics processing pipeline and applying the motion vectors to the image rendered by the graphics processing pipeline to produce the predicted image, determine intensity adjustments for pixels within the gaze area based on a comparison of the screen intensities mapped to the jntensities of the pixels in the gaze area and the dynamic range of the screen, wherein the intensity adjustments are determined based on the predicted image, and wherein the dynamic range of the screen comprises a range of possible intensities of the screen, wherein either or both of the display controller or the APD is configured to:

apply the intensity adjustments to pixels within an image to be displayed on the screen.

7. A system for adjusting intensity for a display including an eve-tracker, the system comprising:

a processor configured to issue graphics processing commands;

an accelerated processing device ("APD") configured to process the issued graphics processing commands to generate an image for display; and a display controller configured to provide image display signals to a display based on the generated image, wherein either or both of the processor or the APD is configured to:

receive an indication of a detected eye movement, determine a gaze area for a screen associated with the display, the gaze area being at the end point of the eye movement, wherein determining the gaze area comprises identifying an approximately circular area around a point of intersection of a gaze direction vector, detected for the eye movement, and the screen, and determine intensity adjustments for pixels within the gaze area based on a comparison of the screen intensities mapped to the intensities of the pixels in the gaze area and the dynamic range of the screen, wherein either or both of the display controller or the APD is configured to:

apply the intensity adjustments to pixels within an image to be displayed on the screen.

8. A system for adjusting intensity for a display including an eye-tracker, the system comprising:

a processor configured to issue graphics processing commands;

an accelerated processing device ("APD") configured to process the issued graphics processing commands to generate an image for display; and a display controller configured to provide image display signals to a display based on the generated image, wherein either or both of the processor or the APD is configured to:

receive an indication of a detected eye movement, determine a gaze area for a screen associated with the display, the gaze area being at the end point of the eye movement, wherein determining the gaze area comprises, and determine intensity adjustments for pixels within the gaze area based on a comparison of the screen intensities mapped to the intensities of the pixels in the gaze area and the dynamic range of the screen, wherein the determining of the intensity adjustments comprises generating mappings between the intensities of pixels for display when the eye is fixated on the gaze area and the intensity range of the screen, and wherein the dynamic range of the screen comprises a range of possible intensities of the screen, wherein either or both of the display controller or the APD is configured to:

apply the intensity adjustments to pixels within an image to be displayed on the screen.

9. The system of claim 8, wherein either or both of the display controller or the APD is configured to apply the intensity adjustments to the pixels within the image by:

adjusting the intensities of pixels of an image to be displayed when the eye is fixated on the gaze area based on the mappings.

10. The system of claim 8, wherein either or both of the processor or the APD is configured to generate the mappings by:

determining a maximum intensity for pixels within the gaze area and a minimum intensity for the pixels within the gaze area;

mapping the minimum intensity to a low intensity value for the display and mapping the maximum intensity to a high intensity value of the display; and mapping intensities of the pixels within the gaze area between the minimum intensity and the maximum intensity to intensities of the display between the low brightness value of the display and the high brightness value of the display.

11. A non-transitory computer-readable medium storing instructions that, when executed by a processor, cause the processor to:

detect an eye movement and determining that the eye movement is associated with a saccade;

skip determining intensity adjustments for at least one frame to be displayed during the saccade;

predict a final position of the eye at the end of the saccade;

determine a gaze area for a screen associated with a display, the gaze area being at the predicted final position of the eye;

determining a predicted image to be displayed when the saccade ends by determining motion vectors for an image rendered by a graphics processing pipeline and applying the motion vectors to the image rendered by the graphics processing pipeline to produce the predicted image;

determine intensity adjustments for pixels within the gaze area based on a comparison of the intensities of the screen intensities mapped to the_pixels in the gaze area and the dynamic range of the screen, wherein the intensity adjustments are determined based on the predicted image, and wherein the dynamic range of the screen comprises a range of possible intensities of the screen; and apply the intensity adjustments to pixels within an image to be displayed on the screen.

12. A non-transitory computer-readable medium storing instructions that, when executed by a processor, cause the processor to:

detect an eye movement;

determine a gaze area for a screen associated with the display, the gaze area being at the end point of the eye movement, wherein determining the gaze area comprises identifying an approximately circular area around a point of intersection of a gaze direction vector, detected for the eye movement, and the screen;

determine intensity adjustments for pixels within the gaze area based on a comparison of the screen intensities mapped to the intensities of the pixels in the gaze area and the dynamic range of the screen, wherein the dynamic range of the screen comprises a range of possible intensities of the screen; and apply the intensity adjustments to pixels within an image to be displayed on the screen.

13. A non-transitory computer-readable medium storing instructions that, when executed by a processor, cause the processor to:

detect an eye movement;

determine a gaze area for a screen associated with the display, the gaze area being at the end point of the eye movement;

determine intensity adjustments for pixels within the gaze area based on a comparison of the screen intensities mapped to the intensities of the pixels in the gaze area and the dynamic range of the screen, wherein the determining of the intensity adjustments comprises generating mappings between the intensities of pixels for display when the eye is fixated on the gaze area and the intensity range of the screen, and wherein the dynamic range of the screen comprises a range of possible intensities of the screen; and applying the intensity adjustments to pixels within an image to be displayed on the screen.

14. The method of claim 2, wherein:
the eye movement is not associated with a saccade.

15. The method of claim 3, wherein:
the eye movement is not associated with a saccade.

16. The system of claim 7, wherein:
the eye movement is not associated with a saccade.

17. The system of claim 8, wherein:
the eye movement is not associated with a saccade.

18. The non-transitory computer-readable medium of claim 12, wherein:
the eye movement is not associated with a saccade.

19. The non-transitory computer-readable medium of claim 13, wherein:
the eye movement is not associated with a saccade.

20. The non-transitory computer-readable medium of claim 13, wherein applying the intensity adjustments to the pixels within the image comprises:

adjusting the intensities of pixels of an image to be displayed when the eye is fixated on the gaze area based on the mappings.

* * * * *